United States Patent [19]
Mori et al.

[11] Patent Number: 5,704,718
[45] Date of Patent: Jan. 6, 1998

[54] SINTERED OIL-IMPREGNATED BEARING AND METHOD FOR MANUFACTURING SAME

[75] Inventors: Natsuhiko Mori, Mie-ken; Yoshinori Ito, Kuwana; Toshihiko Tanaka, Aichi-ken; Yasuhiro Yamamoto, Kuwana, all of Japan

[73] Assignee: NTN Corporation, Osaka, Japan

[21] Appl. No.: 680,052

[22] Filed: Jul. 12, 1996

[30] Foreign Application Priority Data

Jul. 14, 1995 [JP] Japan ................. 7-178811
Oct. 20, 1995 [JP] Japan ................. 7-273173

[51] Int. Cl.$^6$ .................................. F16C 17/02
[52] U.S. Cl. ......................... 384/279; 384/902
[58] Field of Search ..................... 384/279, 902, 384/118, 100, 399

[56] References Cited

U.S. PATENT DOCUMENTS

| | | |
|---|---|---|
| 4,509,803 | 4/1985 | Takenaka et al. ............. 384/279 |
| 4,582,368 | 4/1986 | Fujita et al. ................. 384/279 |
| 5,120,140 | 6/1992 | Nakagawa et al. ............ 384/279 |
| 5,282,688 | 2/1994 | Kanezaki et al. ............. 384/279 |

*Primary Examiner*—Lenard A. Footland
*Attorney, Agent, or Firm*—Nikaido, Marmelstein, Murray & Oram LLP

[57] ABSTRACT

Oil-impregnated sintered bearing has a bearing bore with axially extending grooves formed therein so that in a cross-section of the bearing bore concave and convex portions alternate in the circumferential direction, the surface porosity of the convex portions being preferably larger than that of the concave portions. Formed in part of an inner circumference of the bearing bore, is a bearing surface for supporting a rotary shaft, the rest of the inner circumference other than the bearing surface extending toward an end edge of the bearing bore at a taper angle of 2° to 10 over a width of at least ⅓ or more of an axial width of the bearing surface.

2 Claims, 9 Drawing Sheets

SINTERED OIL-IMPREGNATED BEARING AND METHOD FOR MANUFACTURING SAME

BACKGROUND OF THE INVENTION a. Field of the Invention

The present invention relates to an oil-impregnated sintered bearing suitable for use with a vertical spindle which is subject to unsteady vibrations, a such as a scanner motor spindle used in a laser beam printer or a digital copier.

b. Prior Art

The scanner motor used in the laser beam printer or digital copier is recently in the tendency of a higher speed and a smaller size, and in the laser beam printer, for example, a rotational speed of more than 10,000 revolutions per minute is needed. On the other hand, there is also a strong demand for a lower cost, and it has been studied to use oil-impregnated sintered bearings which are inexpensive as compared with roller bearings. FIG. 10 shows an example of a conventional oil-impregnated sintered bearing, in which reference numeral 3 denotes a rotary shaft, 4" an oil-impregnated sintered bearing, and 5 a housing.

When the oil-impregnated sintered bearing 4" having a bearing bore of an ordinary cylindrical shape (FIG. 10) is used, for a rotary shaft which rotates at a high speed, the oil draw-in action from the bearing side to the rotary shaft 3 side by high speed rotation as well as thermal expansion of oil by frictional heat causes an excessive amount of oil to be drawn out of the oil-impregnated sintered bearing into the bearing clearance and overflow the bearing clearance towards the both sides of the bearing surface. A very slight portion of the overflow permeates through a chamfer portion 7 formed at an end edge of the bearing, but the majority of the overflow passes over the rotary shaft 3 and by the chamfer portion 7, scattering about to the outside under the action of centrifugal force. Therefore, use of the ordinary oil-impregnated sintered bearing 4" in high speed motor causes the oil impregnated in the sintered bearing 4" to be scattered and exhausted in a relatively short period of time, shortening the bearing life extremely short. Besides, the surroundings can be contaminated by the scattering oil.

As other problem, the internal shape of the ordinary oil-impregnated sintered bearing is of a circular cross-section (FIG. 11A), and when such circular bearing is used in the laser beam printer, in which the shaft extends vertically with no radial load being applied, swinging phenomenon called whirl is very likely to occur, and stable rotational accuracy is not obtained. FIG. 11B and FIG. 11C show test results of measurement on an actual motor of a laser beam printer schematically shown in FIG. 9, and as seen therefrom, in the circular sintered bearing, swinging phenomenon (whirl) having a peak at ½ frequency of rotational frequency occurred, and the trajectory of the shaft axis (Lissajous' figure) was not stable. In FIG. 9, reference numeral 1 denotes rotor, 6 a thrust bearing, and 8 a non-contact displacement meter.

To solve these problems, the so-called Rayleigh step bearing was proposed in Japanese Utility Model Publication 47-36739 and Japanese Laid-open Patent 5-180229, among others in which plural grooves (concave portions) extending in the axial direction are formed at equal intervals in the circumferential direction, in the inner surface of the bearing, and the porosity of each convex portion, which is situated between a pair of adjacent concave portions and provides the bearing surface, is set lower than in other portions, if necessary, an order to enhance the rotational accuracy.

According to the test conducted on the actual motor, however, when the porosity level was nearly the same in the convex and concave portions, the shaft runout was significant, and the required specification for the laser beam printer was not satisfied. When the porosity of the convex portions was smaller than that of the other portions, the axial runout was much more significant and the trajectory of shaft axis (Lissajous' figure) was completely unstable, as shown in FIG. 12A and FIG. 12B, so that the bearing of stable rotation accuracy could not be obtained. This was assumed to be mainly due to permeation of oil into the inside of the bearing through the pores in the convex portions before an oil film is formed on the convex portions. That is, in the conventional bearing, the concave portions do not work as an oil sump by reason of permeation of oil, and sufficient oil film is not formed on the convex portions, failing to achieve stable rotational accuracy although the Rayleigh step bearing is so designed that the concave portions serve as oil sump and the ample oil kept in the concave portions is drawn into the narrow space on the convex portions in the bearing clearance along with rotation of the rotary shaft, thereby generating a dynamic action so as to support the rotary shaft stably.

Concerning the method of manufacturing the Rayleigh step bearing, for example, it may be possible to carry out the sizing using a sizing pin of a toothed-wheel-like cross-section. However, it is hard to make the sizing pin of such cross-section with high precision, and in particular the concave portions for forming the bearing surface (convex portion surface) of the bearing, and accordingly, the required dimensions, roundness, cylindricity, or surface roughness could not be maintained at a high level of precision. Moreover, if the concave and convex portions are to be finished simultaneously, undue plastic deformation is required, causing peeling and chip. Hence, the shape, dimensions, and surface porosity cannot be controlled at a high level of precision, which leads to a decrease in working efficiency, an increase in defective rate and of the total cost.

SUMMARY OF THE INVENTION

The invention is proposed in the light of the above problems, and it is therefore an object of the invention to provide an oil-impregnated sintered bearing capable of supporting a rotary shaft stably, and a method of manufacturing such oil-impregnated sintered bearing with high precision and efficiently.

It is another object of the invention to extend the bearing life by preventing scatter of oil from an end opening of the bearing bore, and to realize a stable rotational accuracy free from axial runout.

In one aspect of the invention, the oil-impregnated sintered bearing comprises a bearing main body formed in a porous body from a sintered alloy, and having a lubricating oil, impregnated therein. The main body has a bearing bore for rotatably receiving a rotary shaft. A pattern of alternate concave portions and convex portions is arranged in the circumferential direction of an inner surface of the bearing bore. The surface porosity of the concave portions is set smaller than that of the convex portions. The surface porosity of the concave portions may preferably ranges from 0 to 10% by surface area ratio, while the surface porosity of the convex portions my preferably ranges from 5 to 23% by surface area ratio.

Such oil-impregnated sintered bearing may be manufactured, in the manufacturing process of an ordinary oil-impregnated sintered bearing, with carrying out a first sizing with a first sizing pin and a second sizing with a second sizing pin, on the inner circumference of the bearing bore formed nearly in a circular shape in the bearing main body. That is, the first sizing pin has plural arcuate forming surfaces and plane forming surfaces alternating in the circumferential direction of the outer circumference thereof. The second sizing pin has a circular forming surface on the outer circumference thereof. In the first sizing, the first sizing pin is inserted into the bearing bore with a larger sizing allowance. As a result, only the concave portions are finished to specified shape and size on the arcuate forming surfaces, while the convex portions are provisionally formed in planes on the plane forming surfaces. In the second sizing, the second sizing pin is inserted into the inner circumference of the bearing bore with a smaller sizing allowance, so that only the convex portions aye finished to specific shape and size on the circular forming surface.

The concave portions may be divided into two regions, anterior and posterior as viewed in the direction of rotation of the rotary shaft, and the two regions may differ in surface porosity from each other, i.e., the surface porosity of the anterior may be set smaller than that of the posterior region. The surface porosity of the anterior region of the concave portions may preferably ranges from 0 to 10% by surface area ratio, the surface porosity of the posterior region of the concave portions may preferably ranges from 3 to 20% by surface area ratio, and the surface porosity of the convex portions may preferably ranges from 5 to 25%.

The concave portions function effectively as an sump, and the lubricating oil amply held in the concave portions is drawn into the narrow region (bearing clearance) between the convex portion surface and outer circumference of the rotary shaft, resulting in that the intended action of a dynamic pressure is exerted sufficiently, the runout suppressed, and the trajectory of shaft axis (Lissajous' figure) stabilized.

The oil-impregnated sintered bearing having such concave portions may be manufactured, in the manufacturing process of an ordinary oil-impregnated sintered bearing, by carrying out a first sizing with a first sizing pin and a second sizing with a second sizing pin, on the inner circumference of the bearing bore formed nearly in a circular shape in the bearing main body. In this case, the first sizing pin has plural arcuate forming surfaces and plane forming surfaces alternating in the circumferential direction of the outer circumference, while the second sizing pin has a circular forming surface on the outer circumference. In the first sizing, the first sizing pin is inserted into the inner circumference of the bearing bore with a larger sizing allowance, so that only the concave portions are finished to specified shape and size on the arcuate forming surfaces of the first sizing pin, and that the convex portions are provisionally formed in planes on the plane forming surfaces of the first sizing pin. In the second sizing, the second sizing pin is inserted into the inner circumference of the bearing bore with a smaller sizing allowance, so that only the convex portions are finished to specific shape and size on the circular forming surface of the second sizing pin.

In the manufacturing method as described, as opposed to the conventional method using the sizing pin of a toothed-wheel-like cross-section, the convex portion surfaces which serve as the bearing surfaces are finished by the second sizing pin having a circular forming surface, resulting in the dimensions, roundness, cylindricity, and surface roughness being kept at high precision. Moreover, the region of concave portions and the region of convex portions are formed in separate sizing processes, ensuring modelate plastic deformation without peeling and cut. Hence, the working efficiency is enhanced, which results in the lowering of defective rate and reduction in the total cost.

In other aspect of the invention, the oil-impregnated sintered bearing comprises a porous body formed from sintered alloy impregnated with lubricating oil, the porous body having a bearing bore adapted to rotatably receive a rotary shaft, a bearing surface for supporting the rotary shaft being formed axially in part of an inner circumference of the bearing bore a part of the inner circumference of the bearing bore between the bearing surface and one end edge of the bearing bore extending over in a width of ⅓ or more of an axial width of the bearing surface toward the end edge, and at a taper angle of 2° to 10°.

In such oil-impregnated sintered bearing, a sufficient amount of oil can be held by the expanded portion, and the oil overflowing the bearing surface is once pooled in this expanded portion, thereby preventing scattering-about of the oil through the rotary shaft by the action of the capillary attraction in the expanded portion. While pooled temporarily, the oil is reduced in volume by natural cooling through a wide area of contact with the surroundings, and then permeates through the inner circumference of the expanded portion, thereby returning into the bearing, and it circulates to ooze out onto the bearing surface again by the suction action from the bearing surface, thereby lubricating the rotary shaft. Therefore, the oil does not scatter about and lack of lubrication does not occur, resulting in an increased bearing life, and oil contamination of the surroundings being avoided.

BRIEF DESCRIPTION OF THE DRAWINGS

FIGS. 1A to 1D show an oil-impregnated sintered bearing according to an embodiment of the invention, in which FIG. 1A is a cross sectional view, FIG. 1B is a sectional view taken along the line B—B in FIG. 1A, and FIG. 1C and FIG. 1D are partially magnified views of FIG. 1A;

FIGS. 3A to 3C show test results of test conducted on an actual scanner motor incorporating the oil-impregnated sintered bearing of the invention, in which FIG. 3A is a cross sectional view of the oil-impregnated sintered bearing used in the test, FIG. 3B is a schematic diagram of trajectory of shaft center, and FIG. 3C is a graph showing the result of frequency analysis;

FIGS. 8A to 8C show other embodiment of the invention, in which FIG. 8A is a vertical sectional view of the oil-impregnated sintered bearing and the shaft supported thereby, FIG. 8B is a vertical sectional view of the oil-impregnated sintered bearing, and FIG. 8c is a sectional view taken along the line C—C of FIG. 8B;

DESCRIPTION OF THE PREFERRED MODES

Figure 1A:
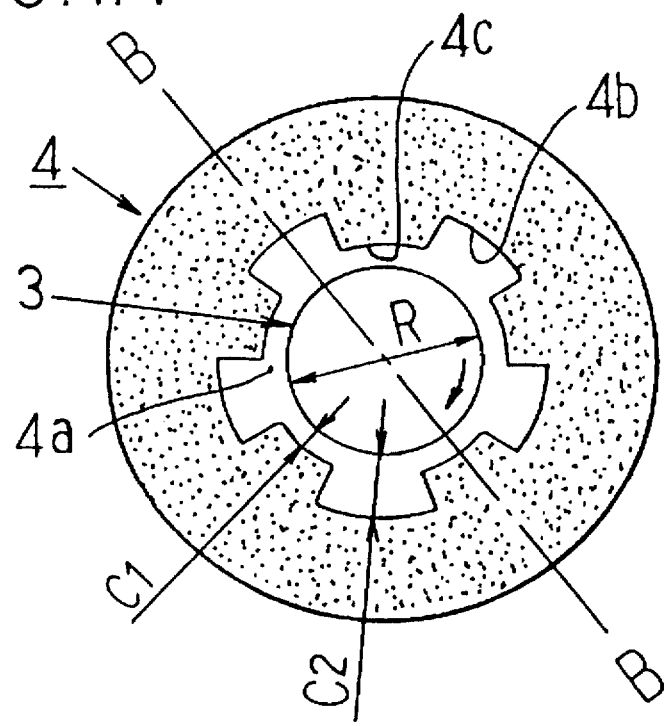
Figure 1B:
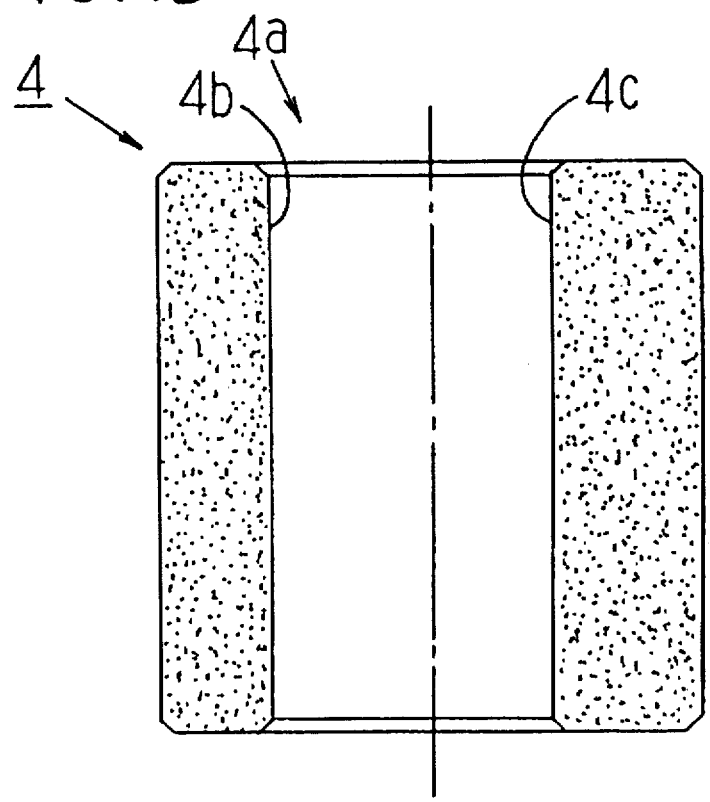
Figure 1C:
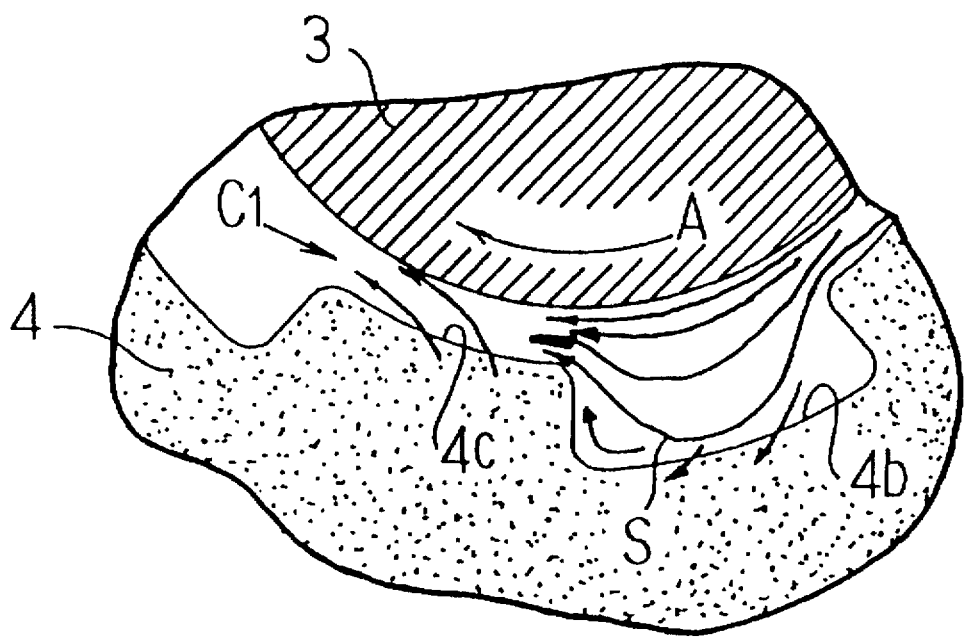
Figure 9:
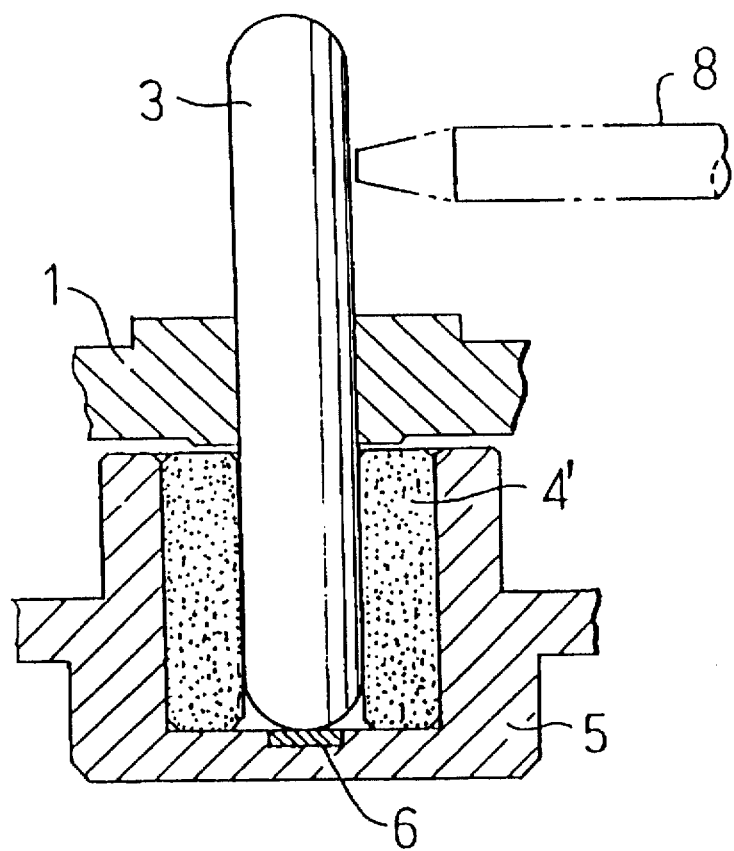
FIG. 9 is a vertical sectional view showing an example of general structure of a scanner motor.
Figure 10:
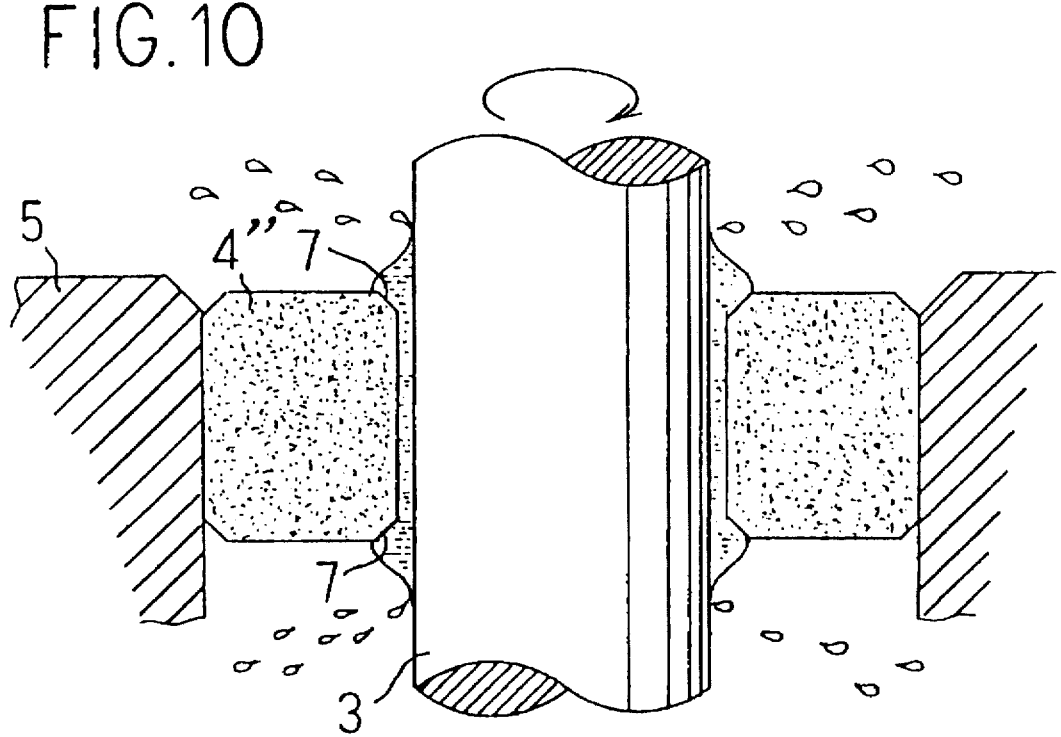
FIG. 10 is a diagram similar to FIG. 8A, schematically illustrating the scattering of lubricating oil in a conventional oil-impregnated sintered bearing.
Figure 11A:
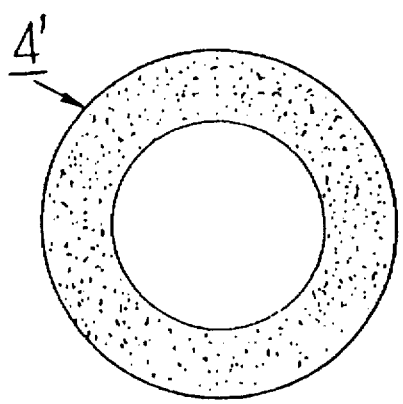
FIGS. 11A to 11C are diagrams similar to FIGS. 3A to 3C, showing results of test conducted on an actual scanner motor incorporating a conventional oil-impregnated sintered bearing.
Figure 11B:
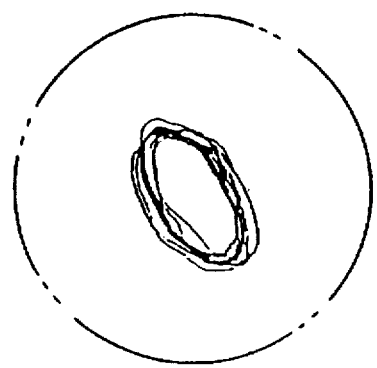
Figure 11C:
Figure 12A:
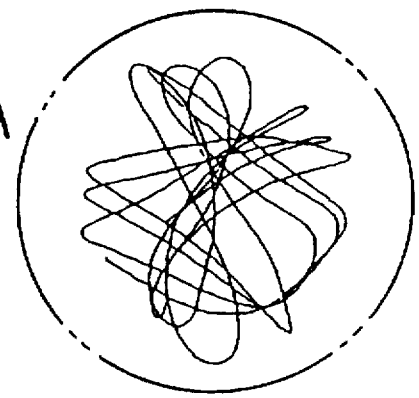
FIGS. 12A and 12B are diagrams similar to FIGS. 3A and 3C, showing results of test conducted on an actual scanner motor incorporating other conventional oil-impregnated sintered bearing.
Figure 12B:
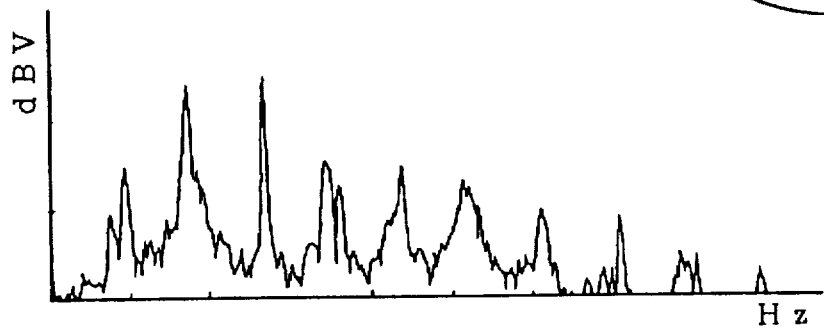

Referring first to an embodiment of the invention shown in FIGS. 1A to 1C, an oil-impregnated bearing 4 is designed to support a rotary shaft 3 for rotation at a high speed relative to a housing 5, the shaft being driven by excitation force between a rotor 1 and a stator 2 in a scanner motor for a laser beam printer as shown, for example, in FIG. 9. In the oil-impregnated sintered bearing 4, a bearing bore 4a for receiving the rotary shaft 3 comprises a porous bearing main body molded from a sintered alloy, and impregnated with lubricating oil. A pattern of alternate concave and convex portions arranged circumferentially in the inner circumference of the bearing bore 4a. Thus, the bearing has plural concave portions, for example, at least three or more axial concave portions 4b, and plural convex portions, for example, at least three or more axial convex portions 4c. The surface of the concave portions 4b and the surface of the convex portions 4c are both arcuate. A proper bearing clearance C1 is provided between the outer circumference of the rotary shaft 3 and the surface of the convex portions 4c, the bearing clearance C1 being set at an optimum value in a range of C1/R=2/10000 to 500/10000, relative to the diameter R of the rotary shaft 3. A bearing clearance C2 between the outer circumference of the rotary shaft 3 and the surface of the concave portions 4b is set at an optimum value in a range of C2/C1=1.2 to 5.0, for example, relative to the bearing clearance C1. In FIG. 1A, it should be appreciated that the dimensions of the bearing clearances C1 and C2 and the pattern of alternate concave and convex portions are depicted in a considerably exaggerated form than actual.

Figure 1D:
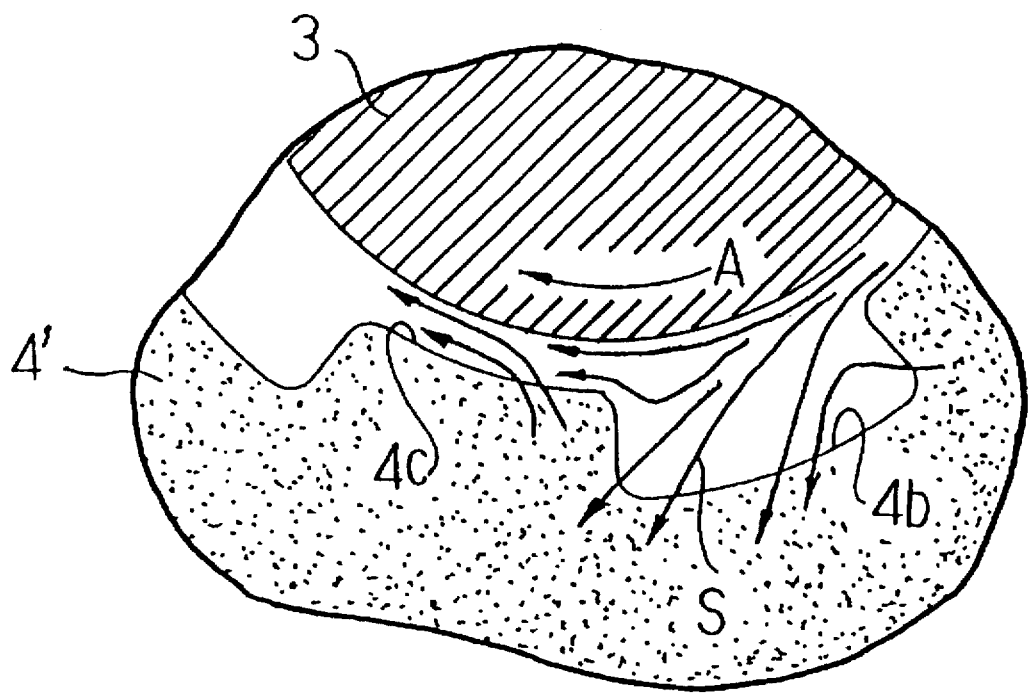

In the inner circumference of the bearing bore 4a, the surface porosity of the concave portions 4b is smaller than that of the convex portions 4c. The surface porosity is preferably in a range of from 0 to 10% by surface area ratio for the concave portions 4b, and in a range of from 5 to 25% by surface area ratio for the convex portions Defining the surface porosity for the concave portions 4b and convex portions 4c as specified herein reduces the amount of lubricating oil S escaping from the surface pores in the concave portions 4b into the bearing as the rotary shaft 3 rotates in the direction of arrow A, as shown in FIG. 1C, so that the concave portions function effectively as an oil sump. Accordingly, the lubricating oil S having no place to go, is drawn, with the rotation of the rotary shaft 3, into the bearing clearance C1 between the outer circumference of the rotary shaft 3 and the surface of the convex portions 4c, ensuring that a dynamic pressure is exerted to provide a stable support for the rotary shaft 3. As stated above, the surface porosity of the concave portions 4b ranges preferably from 0 to 10%. The surface porosity of the concave portions 4b exceeding 10% allows a larger amount of the lubricating oil S to permeate through the surface pores in the concave portions 4b into the bearing, as shown in FIG. 1D, and the concave portions 4b can hardly function as an oil sump effectively. The surface porosity of the convex portions 4c ranges preferably from 5 to 25%. The surface porosity of the convex portions 4c exceeding 25% allows more lubricating oil to permeate through the surface pores of the convex portions 4c into the bearing, and less dynamic pressure is exerted, failing to provide stable support for the rotary shaft 3. To the contrary, when the surface porosity of the convex portions 4c is less than 5%, the lubricating oil is not supplied instantly into the clearance between the rotary shaft 3 and the convex portions 4c upon the starting up of the rotary shaft since the rotary shaft 3, when stopped, and the convex portions 4c are in contact, leading to an increase in a starting torque, which can cause wear.

Figure 3A:
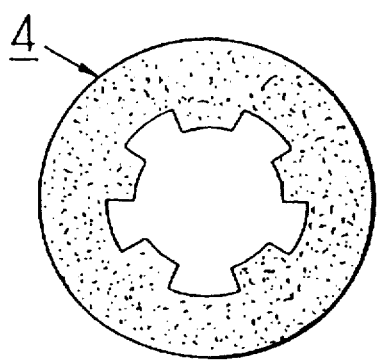
Figure 3B:
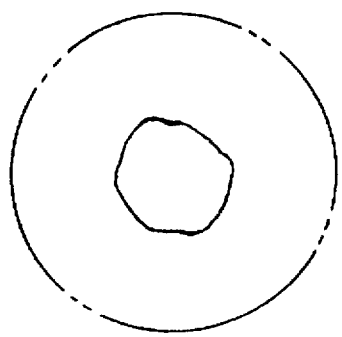
Figure 3C:
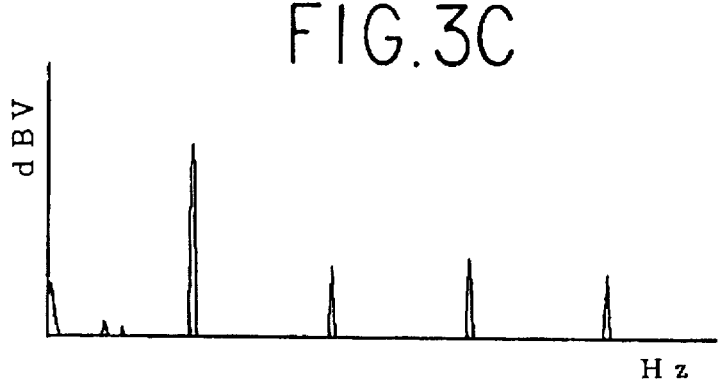

Results of measurement using an actual scanner motor (same in structure as that shown in FIG. 9) of a laser beam printer incorporating this oil-impregnated sintered bearing 4 are shown in FIGS. 3A to 3C. As compared with the case of the conventional bearing previously in relation to FIGS. 11A to 11C and FIGS. 12A and 12B, the axial runout was small, the Lissajous' figure was stable (FIG. 3B), the frequency analysis results disclosed on the components of rotational speed and its high frequency components, and no generation of whirl was recognized (FIG. 3C). These results mean that an oil film is formed between the outer circumference of the rotary shaft 3 and the surface of the convex portions 4c which serves as the bearing surface, and that a stable support for the rotary shaft 3 is provided by the action of a dynamic pressure.

The benefits of this embodiment will be summarized as follows: The concave portions function effectively as an oil sump since the surface porosity of the convex portions which provide the bearing surface is set smaller than that of the concave portions so as to reduce the amount of the lubricating oil escaping into the bearing through the surface pores of the concave portions during rotation of the rotary shaft. Accordingly, the ample lubricating oil held in the concave portions is drawn into a narrow region (bearing clearance) between the convex portions and rotary shaft, ensuring that a dynamic pressure is exerted to provide a stable support for the rotary shaft. Besides, the pores are left to some extent in the surface of the convex portions so that lubricating oil inside the bearing is instantly supplied onto the bearing surface upon starting, which renders the starting torque is small and the wear is less.

Figure 4A:
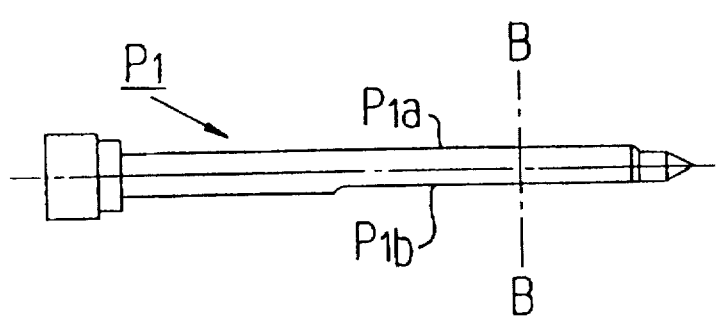
FIGS. 4A and 4B are, respectively, a side view of the first sizing pin and a sectional view taken along the line B—B of FIG. 4A.
Figure 4B:
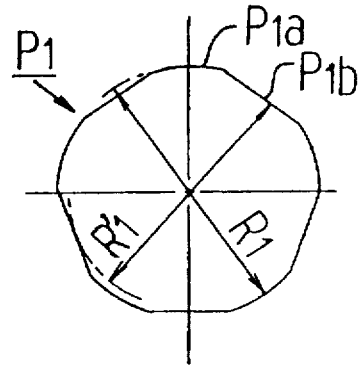
Figure 5A:
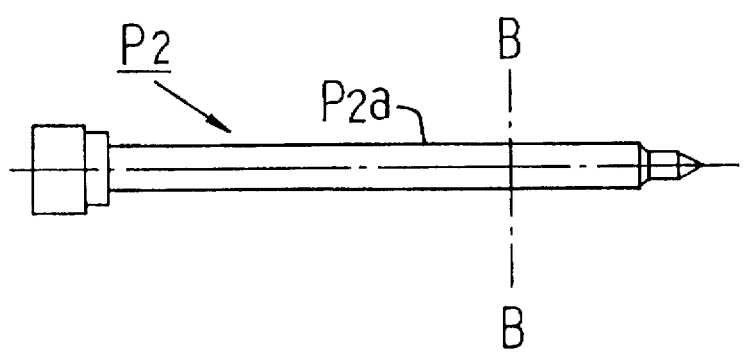
FIGS. 5A and 5B are, respectively, a side view of the second sizing pin and a sectional view taken along the line B—B of FIG. 5A.

The oil-impregnated sintered bearing 4 is obtained by two sizing steps as will now be described, in the manufacturing process of an ordinary oil-impregnated sintered bearing. Generally, the oil-impregnated sintered bearing is manufactured by a series of steps of blending and weighing specified amounts of component materials, mixing and compression molding them into a blank and, following the sintering of the blank, sizing a bearing bore of the blank to thereby finish the bore internal surface, i.e. bearing surface, to the desired shape and dimensions. Thereafter, the blank is impregnated with a specific amount of lubricating oil. The manufacturing process, of the oil-impregnated sintered bearing 4 of the embodiment employs a first sizing step using a first sizing pin P1 in the shape as shown in FIGS. 4A and 4B, and a second sizing step using a second sizing pin P2 in the shape as shown in FIGS. 5A and The first sizing pin P1 has plural arcuate forming surfaces P1a and plane forming surfaces P1b alternating in the circumferential direction. The second sizing pin has a circular forming surface P2a. The arcuate forming surfaces P1a of the first sizing pin P1 have a shape, dimension and circumferential phase corresponding to the concave portions 4b of the bearing bore 4a to be produced. The circular forming surface P2a of the second sizing pin P2 has the outer diameter R2 smaller than the circumscribed circle diameter R1 of the arcuate forming surfaces P1a, and larger than the inscribed circle diameter R'1 of the plane forming surfaces P1b, the outer diameter R2 corresponding to the inner diameter of the convex portions 4c of the bearing bore 4a to be produced.

In the first sizing step process, the first sizing pin P1 is inserted, with a greater sizing allowance, into the inner circumference of the bearing bore 4a formed in nearly circular shape by the compression molding, so as to finish the region for the concave portions 4b to specified shape and size on the arcuate forming surfaces P1a. At this moment, the region for the convex portions 4c is only provisionally formed in a plane shape, copying the plane forming surfaces, P1b of the first sizing pin P1, and is not in as yet specified shape and size.

In the second sizing step, the second sizing pin P1 is inserted with a smaller sizing allowance into the inner circumference of the bearing bore 4a, so that only the region of convex portions 4c is finished to specified shape and size on the circular forming surface P2a. Since the outer diameter R2 of the circular forming surface P2a is set in the specified dimension as described previously, it comes into contact only with the region provisionally formed in a plane in the first sizing step to finish this region to the convex portions 4c of specified size and shape.

According to the manufacturing method described herein, the surface pores in the concave portions 4b are crushed more and the surface porosity becomes smaller than that of the convex portions 4c, since the sizing allowance for finishing the concave portions 4b is larger than the sizing allowance for finishing the convex portions 4c. Accordingly, the concave portions 4b hardly allow the lubricating oil to permeate into the bearing, functioning effectively as an oil sump. Moreover, since the surfaces of the convex portions 4c which provide the bearing surface are finished by the circular forming surface P2a of the second sizing pin P2, the dimensions, roundness, cylindricity, and surface roughness of the convex portions 4c can be finished to a higher precision, as compared with the conventional method using a sizing pin of a toothed-wheel-like cross-section.

Still more, a modelate plastic deformation is insured, without resultant peeling or chip which would otherwise be caused, since the region of concave portions 4b and the region of convex portions 4c are finished in separate sizing steps. Hence, it may lead to improvement of working efficiency, reduction of defective rate, and decrease of total cost.

Figure 6A:
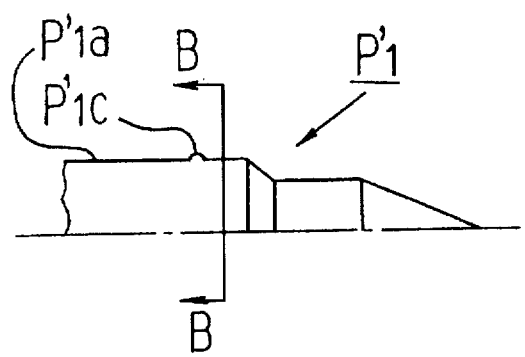
FIGS. 6A and 6B are, respectively, a partial sectional view of a modified form of the first sizing pin and a sectional view taken along the line B—B of FIG. 6A.
Figure 6B:
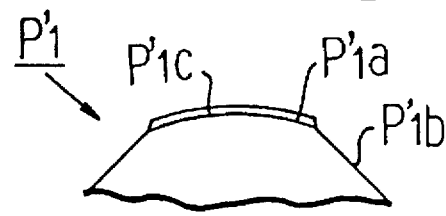

In the sizing process, meanwhile, use of a sizing pin having small protrusions on the forming surface thereof facilitates the crushing of the surface pores. Particularly, as shown in FIGS. 6A and 6B, the first sizing pin P'1 having small protrusions P'1c formed on the arcuate forming surface P'1a may be used in the first sizing step, so as to satisfactorily crush the surface pores in the concave portions 4b so as to achieve the surface porosity of less than several percent.

Figure 2A:
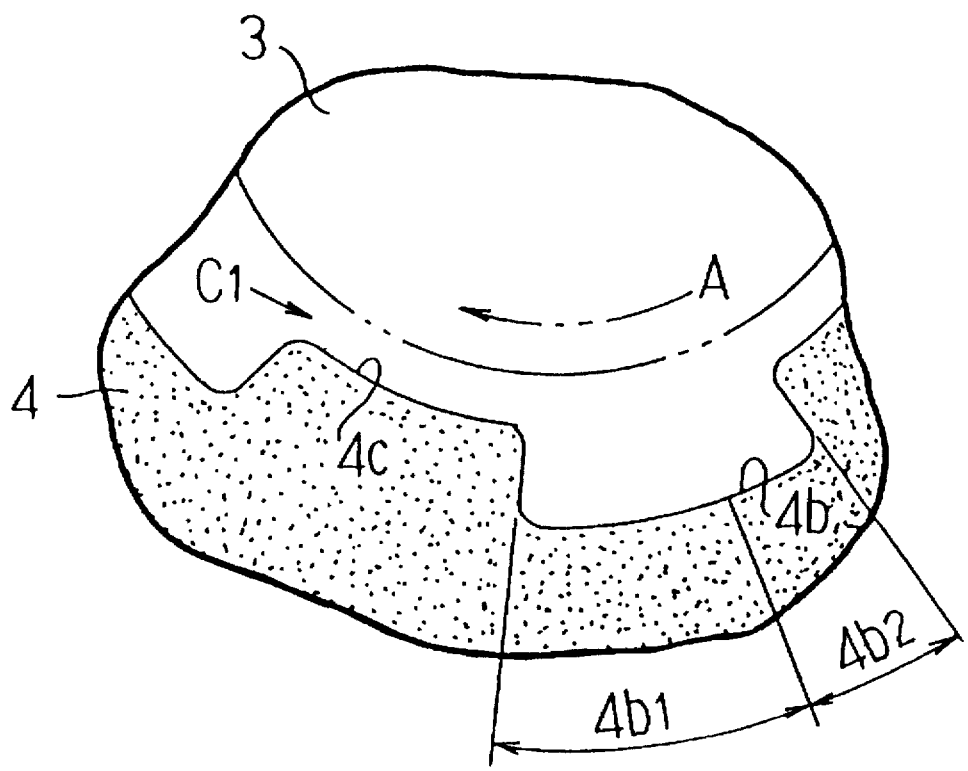
FIGS. 2A and 2B are views similar to FIG. 1C, showing modifications of the concave portions of different surface porosity.
Figure 2B:
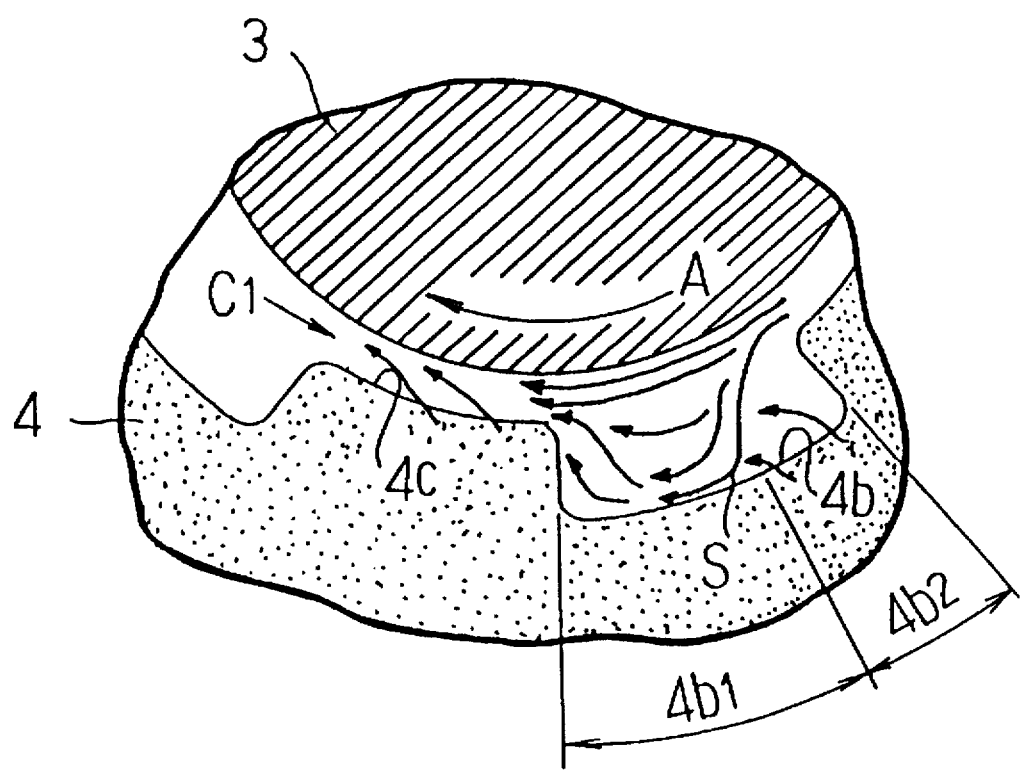

FIGS. 2A and 2B show such a modification that the concave portions 4b is divided into two regions 4b1, 4b2 differing in the surface porosity. The region 4b1 is anterior and the region 4b2 posterior as viewed in relation to the rotational direction A of the rotary shaft 3. The surface porosity of the region 4b1 is smaller than that of the region 4b2. Therefore, the convex portions 4c, the region 4b2 and the region 4b1 are in descending order in surface porosity. The surface porosity for ranges preferably from 0 to 10% by surface area ratio for the region 4b1 of the concave portions 4b, 3 to 20% by surface area ratio for the region 4b2, and 5 to 25% by surface area ratio for the convex portions 4c. Of the concave portion 4b, that region where the lubricating oil S flowing along with rotation of the rotary shaft 3 collides is defined as the region 4b1, and the remainder is defined as the region 4b2. The circumferential width of the region 4b1 should be set taking account of the condition of use, characteristic of lubricating oil and others, and generally, 30 to 90% and 70 to 10% of the overall circumferential width of the concave portion 4b may the region 4b1 preferably be allocated to and the region 4b2, respectively.

In this modification in which, the surface porosity of the concave portions 4b (region 4b1 and region 4b2) and the convex portions 4c is so defined, the lubricating oil S easily oozes out of the pores in the region 4b2 from inside of the bearing as the rotary shaft 3 rotates (in direction A as shown), and this lubricating oil S is collected in the region 4b1 to form an oil sump. Hence, the concave portions 4b function more effectively as an oil sump.

Figure 5B:
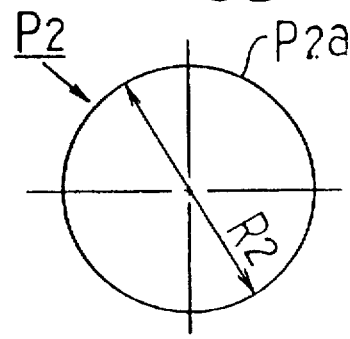
Figure 7A:
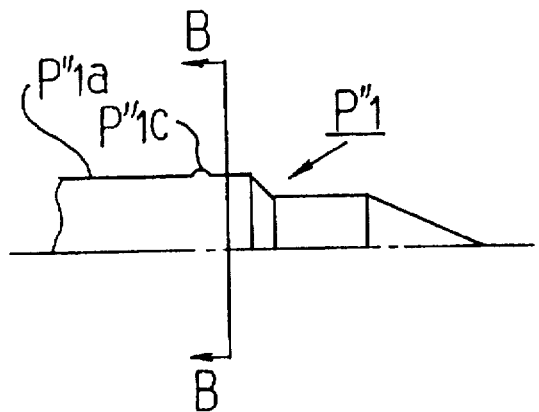
FIGS. 7A and 7B are, respectively, a partial sectional view of a modified form of the first sizing pin and a sectional view taken along the line B—B of FIG. 7A.
Figure 7B:
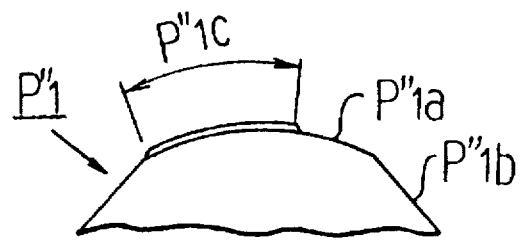

This modified example of the oil-impregnated sintered bearing 4 is manufactured, in the manufacturing process of the embodiment of FIGS. 1A and 1B, by performing a first sizing using the first sizing pin P"1 in the shape shown in FIGS. 7A and 7B, and a second sizing using the second sizing pin P2 in the shape as shown in FIGS. 5A and 5B. In this case, the first sizing pin P"1 has small protrusions P"1c in a partial region of the arcuate forming surface P"1a. The circumferential width of the small protrusions P"1c corresponds to the region 4b1 of the concave portions 4b, and the circumferential width of the arcuate forming surface p"1a corresponds to the region 4b2 of the concave portions 4b. In the first sizing step, use of the first sizing pin P"1 having small protrusions P"1c in a partial region of the arcuate forming surface P"1a facilitates the crushing of the surface pores in the region 4b1 of the concave portions 4b, so that the surface porosity of the region 4b1 may be defined in the specified range.

Figure 8A:
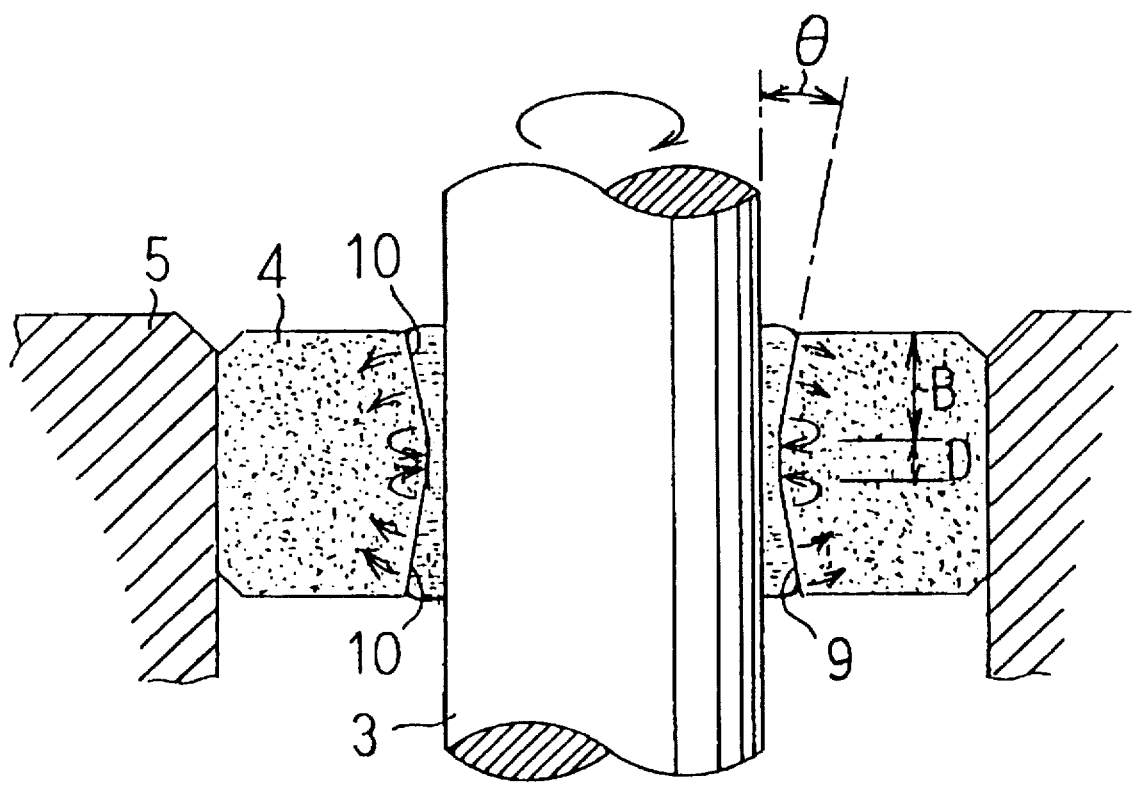
Figure 8B:
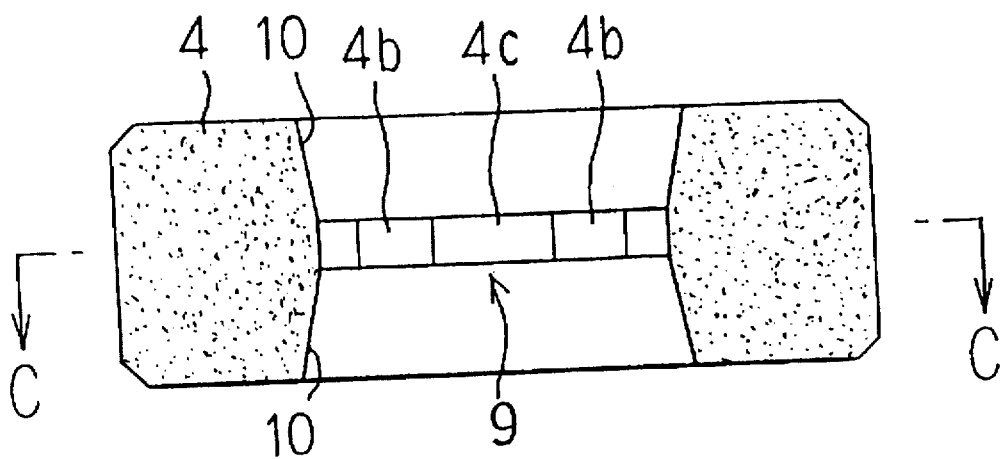
Figure 8C:
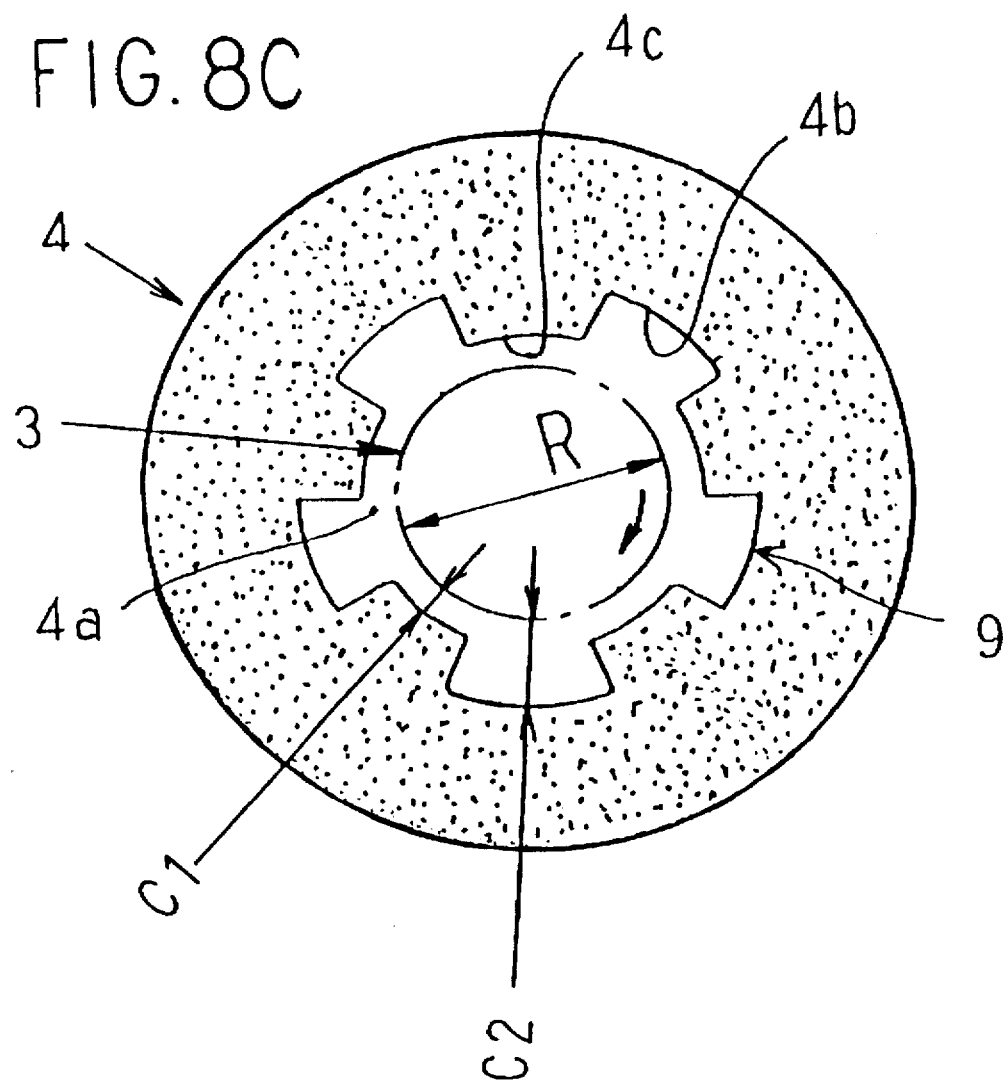

Referring next to an embodiment shown in FIGS. 8A to 8C, in the oil-impregnated sintered bearing 4 shown in FIG. 8A, an annular bearing surface 9a is formed in the middle of the vertical direction of the bearing bore 4a, and expanded portions 10 gradually expanding in diameter at a taper angle θ=3° towards upper and lower ends are formed at upper and lower sides of the bearing surface 9. In such arrangement, as shown in FIG. 8A, if the lubricating oil oozing out into the bearing clearance C2 overflows from the bearing clearance C2, during rotation of the rotary shaft 3, the overflow permeates again into the bearing 4 through the inner circumference of the expanded portions 10, and then oozes again into the bearing surface 9 to circulate. The expanded portions 10 form with the outer circumference of the shaft 3 a clearance which provides an oil sump of relatively large amount of volume, although its radial dimension is as small as capillary attraction is generated. Therefore, the oil oozing out of the bearing surface 9 is once pooled in the oil sump thus formed, and is prevented from scattering by the capillary attraction. Hence, scatter of oil is prevented, and poor lubrication due to scatter and shortage of oil does not occur, so that the bearing 4 endures for a longer period of time. Besides, the surroundings will not be contaminated by any scattering oil. The taper angle θ of the expanded portions 10 ranges preferably from 2° to 10°. If the taper angle θ is less than 2°, the clearance between the inner circumference of the expanded portions 10 and the rotary shaft 3 is too small, which causes a drawing action to be induced with the rotation of the rotary shaft 3 to thereby allow the oil to ooze out, deteriorating in the oil collecting function. On the other hand, if the taper angle θ exceeds 10°, the clearance around the rotary shaft 3 is too wide and capillary attraction does not take effect, resulting in that the oozing oil passes through the expanded portions 10 to leak out along the rotary shaft 3 and scatter about by the action of centrifugal force.

The axial width B of the expanded portions 10 is required to be at least ⅓ or more of the axial width D of the bearing surface 9. There is no particular upper limit for the axial width B from the viewpoint of bearing function, and it is preferred to be as long as possible in relation to the dimension of the place for accommodating the bearing 4. If the axial width of the expanded portions 10 is less than ⅓ of that of the bearing surface, the space for pooling the oil is too narrow, and the oil can overflow the expanded portions 10. The expanded portions 10 need not be formed at both the upper and lower ends of the bearing 4 necessarily, but, for example, in the case where the rotary shaft 3 is supported by a pair of upper and lower bearings 4, one expanded portion 10 may be provided at the outer end of each bearing, that is, at the upper end of the upper bearing and at the lower end of the lower bearing. When the expanded portion 10 is provided only at one end of the bearing, it is not necessary for the bearing surface 9 to be located axially in the middle of the bearing bore 4a, but may be formed at an end opposite to the expanded portion 10.

In combination with the bearing 4 of the embodiment, it is also possible to employ the embodiment of FIGS. 1A to 1C, and hence the axial grooves for exerting a dynamic pressure may be formed in the bearing surface 9, so that the whirl may be suppressed. That is, as shown in FIGS. 8B and 8C, a plurality of, at least three axial grooves are formed in the bearing surface 9 at equal intervals in the circumferential direction, so that the concave portions 4b and convex portions 4c of the arcuate surface are arranged alternately in the circumferential direction of the bearing surface 9 as viewed in a cross-section. Between the rotary shaft 3 and the convex portions 4c, there is a proper clearance C1, and the ratio of the clearance C1 to the shaft diameter R is in a range of C1/R=2/10000 to 500/10000. The ratio of the clearance C2 between the rotary shaft 3 and the concave portions 4b to the clearance C1 is in a range of C2/C1=1.2 to 5.0. The porosity of the bearing surface 9 is smaller in the concave portions 4b than in the convex portions 4c. Thus, the porosity of the convex portions 4c and the concave portions 4b preferably ranges from 3 to 15% and from 0 to 10%, respectively. As a result, a less amount of oil permeates from the concave portions 4b into the bearing 4, as shown in FIG. 1D, and the concave portions 4 function effectively as an oil sump. The oil thus collected in the concave portions 4b is drawn into the narrow region between the rotary shaft 3 the and convex portions 4c with the rotation of the shaft 3, ensuring that a dynamic pressure is exerted to provide a stable support for the rotary shaft 3. Moreover, as described previously in relation to FIGS. 2A and 2B, the concave regions 4b may be divided into two regions 4b1, 4b2 of different surface porosity, the surface porosity of the anterior region 4b1 being smaller than that of the posterior region 4b2, with the same effects as in the arrangement of FIGS. 2A and 2B.

What is claimed is:

1. An oil-impregnated sintered bearing comprising a porous body formed from sintered alloy and impregnated with, lubricating oil, the porous body having a bearing bore adapted to rotatably receive a rotary shaft, wherein the bearing bore has in an inner circumference thereof a pattern of alternate concave portions and convex portions arranged in the circumferential direction, and wherein surface porosity of the concave portions is smaller than that of the convex portions.

2. The oil-impregnated sintered bearing of claim 1, wherein the surface porosity of the concave portions ranges from 0 to 10% by surface area ratio, and the surface porosity of the convex portions ranges from 5 to 25% by surface area ratio.

\* \* \* \* \*